(12) United States Patent
Little

(10) Patent No.: US 11,520,157 B2
(45) Date of Patent: Dec. 6, 2022

(54) POLARIZATION ATTENUATOR AND POLARIZATION ATTENUATION METHOD

(71) Applicant: QXP Technologies Inc., Shaanxi (CN)

(72) Inventor: Brent Everett Little, Shaanxi (CN)

(73) Assignee: QXP Technologies Inc., Shaanxi (CN)

( * ) Notice: Subject to any disclaimer, the term of this patent is extended or adjusted under 35 U.S.C. 154(b) by 171 days.

(21) Appl. No.: 17/044,297

(22) PCT Filed: Feb. 12, 2019

(86) PCT No.: PCT/CN2019/074858
§ 371 (c)(1),
(2) Date: Sep. 30, 2020

(87) PCT Pub. No.: WO2020/052197
PCT Pub. Date: Mar. 19, 2020

(65) Prior Publication Data
US 2021/0157159 A1    May 27, 2021

(30) Foreign Application Priority Data

Sep. 15, 2018 (CN) .......................... 201811077407.9

(51) Int. Cl.
*G02B 27/28* (2006.01)

(52) U.S. Cl.
CPC ......... *G02B 27/286* (2013.01); *G02B 27/281* (2013.01)

(58) Field of Classification Search
CPC ............................ G02B 27/286; G02B 27/281
USPC ........................................................ 353/20
See application file for complete search history.

(56) References Cited

FOREIGN PATENT DOCUMENTS

| CN | 1402052 A | 3/2003 |
|---|---|---|
| CN | 1576921 A | 2/2005 |
| CN | 101592549 A | 12/2009 |
| CN | 104570201 A | 4/2015 |
| CN | 108107507 A | 6/2018 |

(Continued)

*Primary Examiner* — Jerry L Brooks
(74) *Attorney, Agent, or Firm* — Novick, Kim & Lee, PLLC; Allen Xue

(57) ABSTRACT

The present disclosure provides a polarization attenuator and a polarization attenuation method to solve the problem of polarization dependent loss of optical devices, or to be used in optical devices or systems as a polarizer structure. The polarization attenuator comprises a first main waveguide, an offset waveguide and a second main waveguide which are arranged in sequence, wherein an output surface of the first main waveguide partially overlaps an input surface of the offset waveguide; an output surface of the offset waveguide partially overlaps an input surface of the second main waveguide; the first main waveguide or the second main waveguide supports fundamental modes and supports at least one high order mode. Meanwhile, the present disclosure further provides the polarization attenuation method comprising following steps: 1) optical signals enter the first main waveguide; 2) the optical signals excite high order modes at a joint of the first main waveguide and the offset waveguide; and 3) the signals are mixed again at a joint of the second main waveguide and the offset waveguide, and power between a fundamental mode and high order modes of the offset waveguide is redistributed between the fundamental mode and the high order mode of the second main waveguide.

16 Claims, 6 Drawing Sheets

(56) References Cited

FOREIGN PATENT DOCUMENTS

JP          H0933743 A  *  2/1997  ............. G02B 6/136
WO          0235245 A1     5/2002

* cited by examiner

POLARIZATION ATTENUATOR AND POLARIZATION ATTENUATION METHOD

FIELD

The present disclosure relates to the field of integrated optical circuits, in particular to a polarization attenuator and a polarization attenuation method.

BACKGROUND

In an optical system, PDL (Polarization Dependent Loss) is undesirable because the optical system cannot always maintain the polarization state along an optical fiber link, polarization naturally makes optical signals chaotic and unpredictable, and the link is optimized around the equalized power of two polarization states. Integrated optical components often have PDL phenomena, for example, in an integrated optical path, the loss of one polarization state is usually higher than the loss of the other polarization state due to the difference in propagation loss between the two polarization states, or due to the polarization differences in the response to certain optical components, and it is generally desirable to achieve PDL balance in these optical paths. A polarization attenuator is a device capable of achieving PDL balance. A polarization attenuator is a device used for attenuating the other polarization state relative to one polarization state, and the device can be used for reducing polarization dependent loss, namely PDL.

Another application of the polarization attenuator is as a polarizer. Relative to the second polarization state, the polarizer is quite high in extinction for the first polarization state. In an ideal case, a polarizer would cause infinite attenuation in one polarization state. In practice, it may be necessary for the polarizer to cause attenuation of −10 dB to −30 dB to a desired polarization state.

SUMMARY

The present disclosure provides a polarization attenuator and a polarization attenuation method for solving the problem of polarization dependent loss of optical devices, or to be used in optical devices or systems as a polarizer structure.

The technical solution of the present disclosure is as follows:

a polarization attenuator comprises a first main waveguide, an offset waveguide and a second main waveguide which are arranged in sequence, wherein an output surface of the first main waveguide partially overlaps an input surface of the offset waveguide; an output surface of the offset waveguide partially overlaps an input surface of the second main waveguide, and the first main waveguide or the second main waveguide supports fundamental modes, and supports at least one high order mode.

Further, the first main waveguide and the second main waveguide are same in cross-sectional shape and size.

Further, the offset waveguide and the first main waveguide are same in the cross-sectional shape and size, the first main waveguide and the second main waveguide are coaxially arranged, and a center line of the offset waveguide is set in an upward offset manner relative to center lines of the first main waveguide and the second main waveguide.

Further, the offset waveguide and the first main waveguide are same in cross-sectional shape and size, the center line of the offset waveguide is set in an upward offset manner relative to the center line of the first main waveguide, and the center line of the second main waveguide is set in an upward offset manner relative to the center line of the offset waveguide.

Further, the cross-sectional dimension of the offset waveguide is smaller than the cross-sectional sizes of the first main waveguide and the second main waveguide, and the offset waveguide is coaxial with the first main waveguide and the second main waveguide.

Further, the cross-sectional size of the offset waveguide is smaller than the cross-sectional sizes of the first main waveguide and the second main waveguide, the first main waveguide and the second main waveguide are coaxially arranged, and the center line of the offset waveguide is set in a downward or upward offset manner relative to the center lines of the first main waveguide and the second main waveguide.

Further, the cross-sectional size of the offset waveguide is smaller than the cross-sectional sizes of the first main waveguide and the second main waveguide, the first main waveguide and the second main waveguide are coaxially arranged, and the center line of the offset waveguide is set in a leftward or rightward offset manner relative to the center lines of the first main waveguide and the second main waveguide.

Further, the cross-sectional size of the first main waveguide is larger than the cross-sectional size of the offset waveguide, the cross-sectional size of the offset waveguide is larger than the cross-sectional size of the second main waveguide, or the cross-sectional size of the first main waveguide is smaller than the cross-sectional size of the offset waveguide, and the cross-sectional size of the offset waveguide is smaller than the cross-sectional size of the second main waveguide.

Meanwhile, the present disclosure further provides a method for achieving polarization attenuation through the above polarization attenuator, and the method comprises the following steps:

1) optical signals enter the first main waveguide;
2) the optical signal excites a high order mode at a joint of a first main waveguide and an offset waveguide; and
3) the signals are mixed again at a joint of the second main waveguide and the offset waveguide, and the power between a fundamental mode and high order modes of the offset waveguide section is redistributed between a fundamental mode and a high order mode of a second main waveguide.

Further, in step 3), a length of an offset waveguide section is controlled, and the power between the fundamental mode and the high order modes of the offset waveguide can be controlled to be redistributed between the fundamental mode and the high order mode of the second main waveguide.

Compared with the prior art, the present disclosure has the following technical effects:

1. the polarization attenuator of the present disclosure is of a low-PDL optical waveguide connection structure, and a value of PDL may range from 0 dB to −2 dB; and
2. when being used as a polarizer, the polarization attenuator can reach an extinction ratio as high as −30 dB.

DESCRIPTION OF THE REFERENCE NUMERALS

Figure 1:
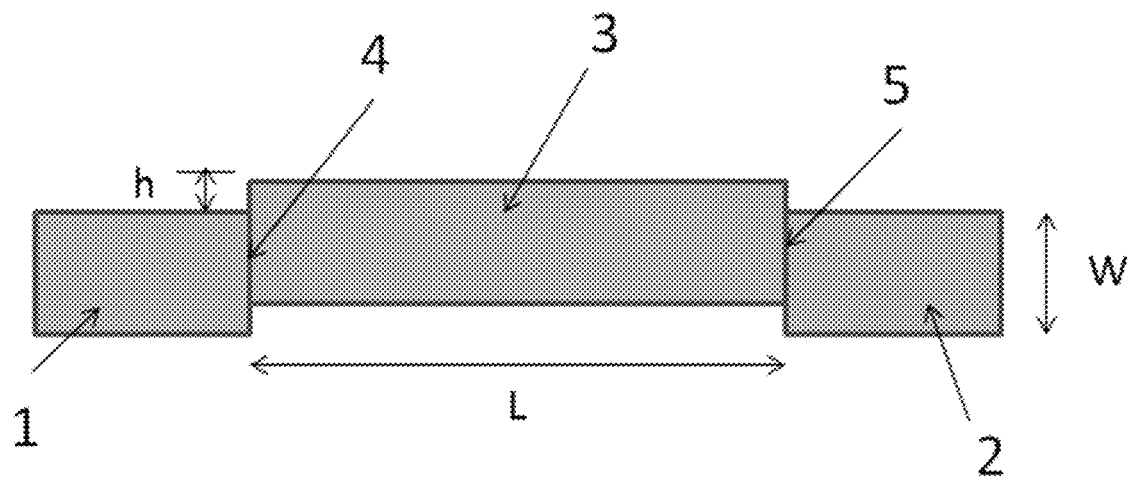
FIG. 1 is a schematic diagram of a first embodiment of a polarization attenuator of the present disclosure.

1—First main waveguide, 2—Second main waveguide, 3—Offset waveguide, 4—First seam and 5—Second seam.

DETAILED DESCRIPTION OF THE EMBODIMENTS

The content of the present disclosure will be further described in detail below in conjunction with the accompanying drawings and specific embodiments.

The present disclosure discloses a low-PDL optical waveguide connection structure, and a value of the PDL, can range from 0 dB to −2 dB. When being used as a polarizer, the structure can reach an extinction ratio up to −30 dB. The structure is applicable to integrated optical circuits, or planar lightwave circuits (PLC). The low-PDL optical waveguide connection structure has the function of transmitting and modulating signals in chips and can be used as a basic element to form other optical elements on the chips.

The principle of a polarization attenuator is to increase the loss of the other polarization state relative to one polarization state at a specific position along an optical path. In a simplest polarization attenuator structure of the present disclosure, the principle can be realized by introducing a section of offset waveguide, and therefore a waveguide with discontinuous boundary is created.

The structure of the polarization attenuator of the present disclosure is as follows: main waveguides comprise a first main waveguide 1 and a second main waveguide 2, wherein an offset waveguide 3 is arranged between the first main waveguide 1 and the second main waveguide 2, wherein an output surface of the first main waveguide 1 partially overlaps an input surface of the offset waveguide 3, and an output surface of the offset waveguide 3 partially overlaps an input surface of the second main waveguide 2. An offset waveguide section has a certain offset value (represented by "h") relative to the main waveguide, and the offset waveguide section has a certain length which is represented by "L".

The first main waveguide 1, the second main waveguide 2 and the offset waveguide 3 are not limited in cross-sectional shapes, the cross sections are generally rectangular, but not limited to be rectangular, for example, may be circular. The cross-sectional shapes of the first main waveguide 1, the offset waveguide 3 and the second main waveguide 2 may be same or different, the first main waveguide 1, the offset waveguide 3 and the second main waveguide 2 are not limited to the coaxial arrangement, and the cross-sectional sizes (cross-sectional areas) of the main waveguide 1, the offset waveguide 3 and the second main waveguide 2 may be same or different.

Assuming that optical signals propagate from left to right, and the waveguides only support a single fundamental mode input signal in a main waveguide input section of the structure, waveguides are discontinuous at two ends of the offset waveguide section, so that a high order mode is excited. That is, a fundamental mode of the main waveguide input section is redistributed between a fundamental mode of the offset waveguide and one or more high order modes of the offset waveguide from a first offset position (a first waveguide connection structure or a first seam 4). Under the fundamental mode and the high order modes, the optical signals propagate with own characteristic propagation constant or phase velocity. A phase velocity depends on a specific polarization state of the optical signals and a mode order. The accumulation of optical phases over the length L depends on the polarization state and the mode order. At a second waveguide connection structure, the signals are mixed again. The power between the fundamental mode and the high order modes of the offset waveguide is redistributed between the fundamental mode and the high order mode (if supported) of a main waveguide output section. Since light signals are continuous, the power of a fundamental mode or a high order mode obtained in the main waveguide after the light signals pass through the second waveguide connection structure depends on a relative phase of the fundamental mode and the high order mode closely before the second waveguide connection structure. By controlling the length L of the offset waveguide section, the final redistributed power in the main output waveguide behind the second waveguide connection structure can be controlled.

The present disclosure provides a polarization attenuation method, comprising the following steps:

1) optical signals enter a first main waveguide;
2) the optical signals excite a high order mode at a joint of a first main waveguide and an offset waveguide; and
3) the signals are mixed again at a joint of a second main waveguide and the offset waveguide, and the power between a fundamental mode and high order modes of the offset waveguide section is redistributed between a fundamental mode and a high order mode of the second main waveguide.

FIG. 1 shows a first embodiment of the present disclosure. The first main waveguide 1 and the second main waveguide 2 are same in cross-sectional shape and size, the offset waveguide 3 and the first main waveguide 1 are same in cross-sectional shape and size, the offset waveguide 3 is in an upward offset relative to the first main waveguide 1 and the second main waveguide 2, and the first main waveguide 1 and the second main waveguide 2 are symmetrical with respect to the offset waveguide 3 (that is, the first main waveguide I and the second main waveguide 2 are coaxially arranged).

In order to realize polarization attenuation configuration in FIG. 1, a length L of the offset waveguide section should be appropriately selected (the length can be Obtained according to a beam propagation method or BPM simulation software). The phase accumulation depends not only on a mode order, but also on a polarization state. For the polarization state, the length L of the offset waveguide is given, most of the high order modes in the offset waveguide are reconstructed to form fundamental modes at a waveguide output end. That is, the high order modes are redistributed to form the fundamental modes at the second waveguide connection structure. Therefore, such model is essentially "lossless". On the other hand, for the other polarization state, the fundamental modes are mixed with the high order modes, so that more power from the fundamental modes is redistributed to the high order modes output by the main waveguides. In a main waveguide section, high order modes may comprise radiation modes, then additional losses may be caused to the fundamental modes, the loss degree depends on the details of the waveguides, especially an offset value h of the offset waveguide (the offset value h can be calculated according to a beam propagation method or BPM simulation software).

Figure 2:
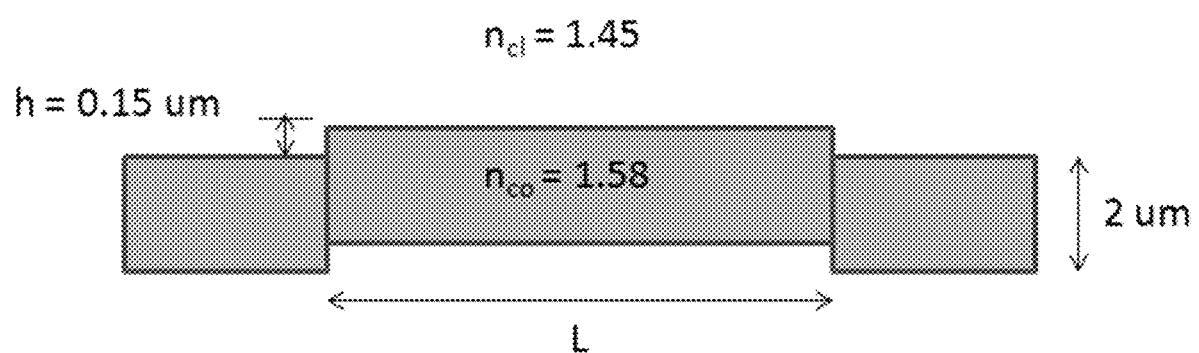
FIG. 2 is a schematic diagram of a specific structure of the first embodiment of the polarization attenuator of the present disclosure.

FIG. 2, FIG. 3, FIG. 4A and FIG. 4B show illustrative examples of representative characteristics of polarization attenuators. FIG. 2 shows a representative waveguide, wherein a width is 2 μm, a waveguide core layer refractive index $n_{co}$ is 1.58, a refractive index $n_{cl}$ of a cladding layer on each side of a core layer is 1.45, and an offset h is 0.15 μm. The structure is simulated with light waves being 1.310 μm. For illustration purposes, two-dimensional waveguides or so-called "slab waveguide" are shown. All results, conclusions and physical principles are equally applicable to complete three-dimensional waveguides. (The beam propagation method or so-called "BPM" method is adopted for simulation. In the field, the BPM method is widely known and used).

Figure 3:
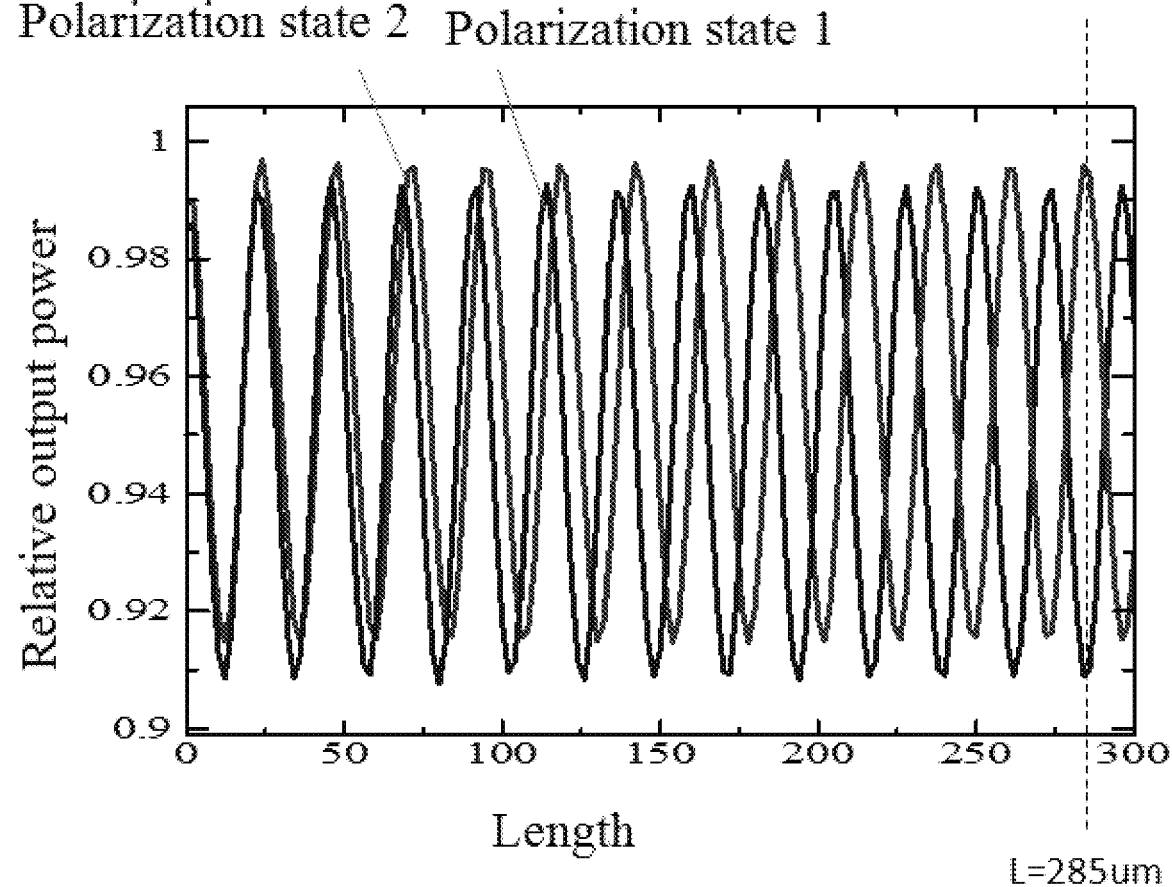
FIG. 3 is a schematic diagram of a functional relationship between simulated intensities of two polarization states and a length of a second waveguide in the polarization attenuator of the present disclosure.

FIG. 3 shows the remaining simulated power of fundamental modes in the main waveguides after the length L of the offset waveguide and the second connection structure (a second seam 5). A polarization state 1 curve shows the fundamental mode power of one polarization state, and a polarization state 2 curve shows the fundamental mode power of a second polarization state. The remaining power in the two states is a periodic function of the length L and varies between lossless and certain maximum loss. Oscillation periods of the polarization states are not exactly the same. Eventually, one polarization state is almost lossless at a certain length, while the second polarization state undergoes maximum attenuation (for a given offset value h) the embodiment, the length L is 285 μm.

Figure 4A:
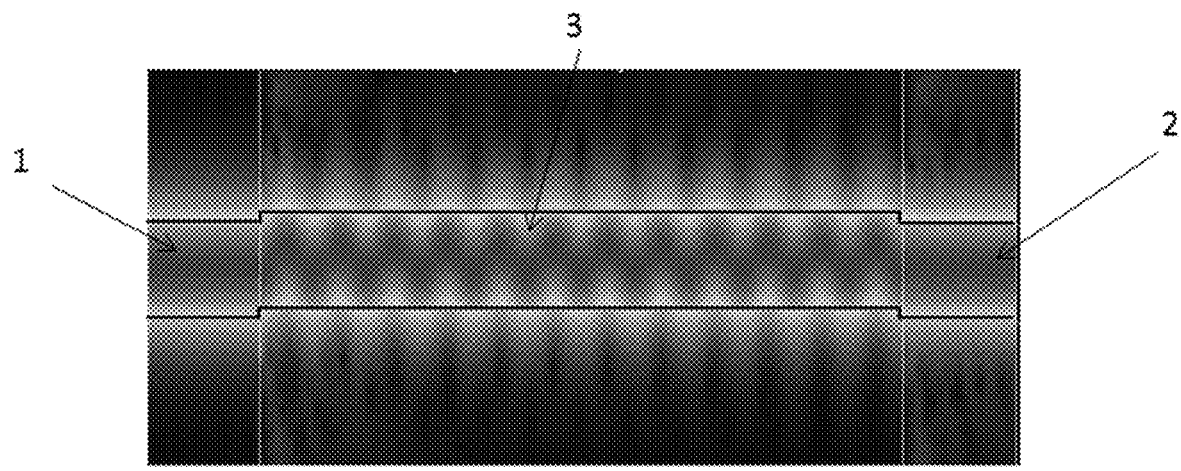
FIG. 4A is a schematic diagram of simulated light field intensity and a specific length of a polarization state of the polarization attenuator of the present disclosure.
Figure 4B:
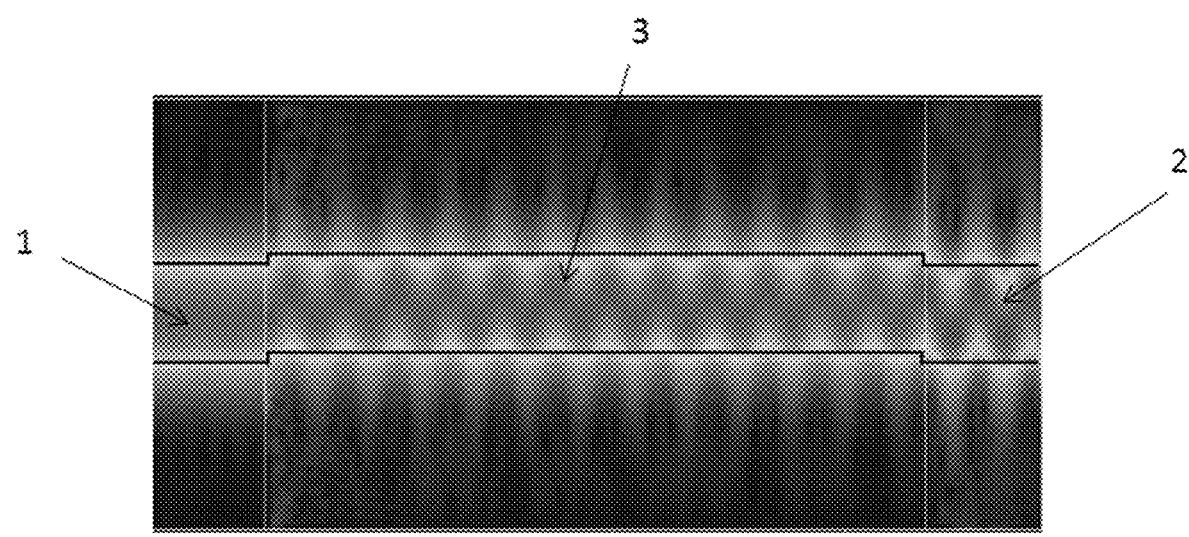
FIG. 4B is a schematic diagram of simulated light field intensity and a specific length of the other polarization state of the polarization attenuator of the present disclosure.

For the structure in FIG. 2, FIG. 4A and FIG. 4B show a simulated light field intensity of the waveguide structure when the length of the offset waveguide section L is 285 μm and the wavelength is 1.310 μm. A light field propagates from left to right. Since a left incident light field is completely located in the fundamental modes before encountering a first connection structure (a first seam 4), the light field is uniform. When interacting with the first connection structure of the offset waveguide section, the light field excites the fundamental mode and the high order mode in the offset waveguide. The fundamental mode and the high order mode propagate together at different phase velocities along the offset waveguide section. Since the light field is continuous, these two modes "collide" with each other, and therefore a "swaying" or "oscillating" composite field is formed along the waveguide section. At the second connection structure (a second seam 5) at a tail end of the offset waveguide, the modes are mixed again to enter the main waveguide output section. In FIG. 4A, for the first polarization state, an optical field in the main waveguide output section is uniform again, thereby indicating that the power in the offset waveguide has been converted into a single fundamental mode. In FIG. 4B, for the second polarization state, oscillation of the light field at the main waveguide output section is significantly enhanced, thereby indicating that the additional power has been converted from the fundamental mode into one or more high order modes. Therefore, the fundamental mode in the second polarization state has higher loss compared with the first polarization state.

Figure 5:
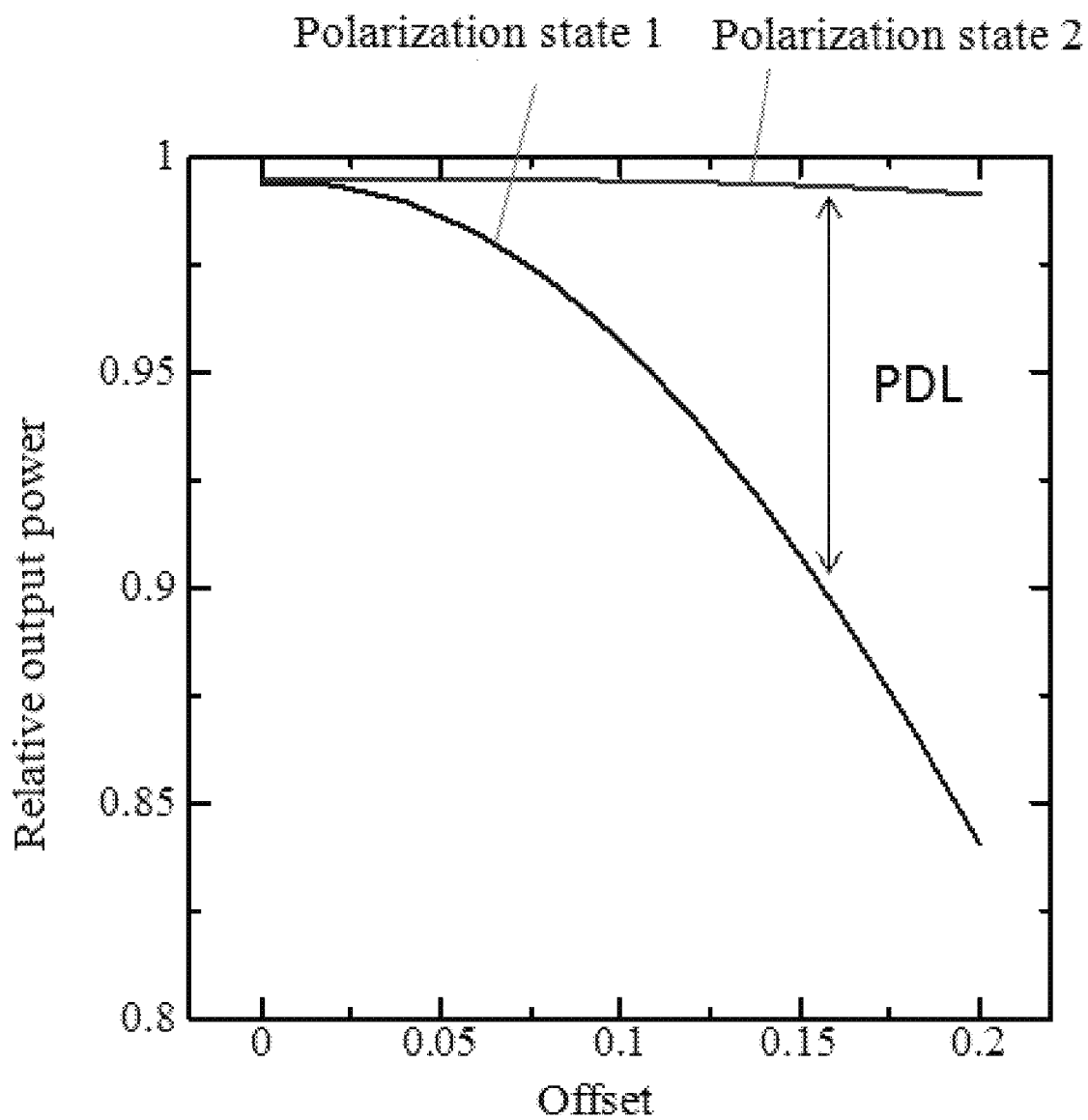
FIG. 5 is a schematic diagram of simulated intensity output by the polarization attenuator of the present disclosure at different offset values.

FIG. 5 shows an example of an effect of changing the offset value h. The structure simulating the polarization attenuator is the same as the structures shown in FIGS. 2, 3, 4A and 4B, the length L is 285 μm, but the offset h changes here, as h increases, the attenuation of one of the polarization states increases, a PDL value can be continuously changed within a certain range by adjusting h.

Figure 6A:
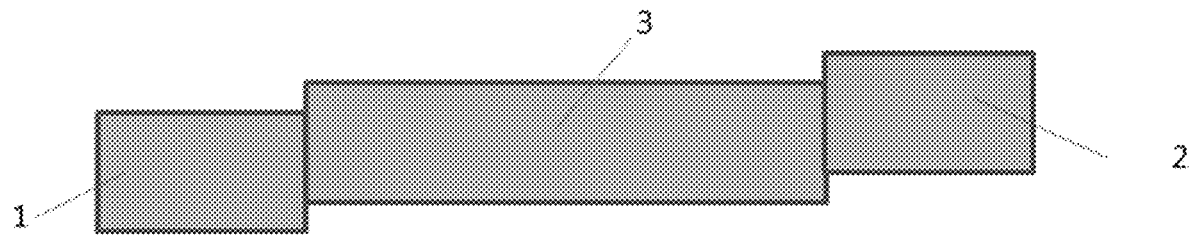
FIG. 6A is a schematic diagram of a second embodiment of the polarization attenuator of the present disclosure.
Figure 6B:
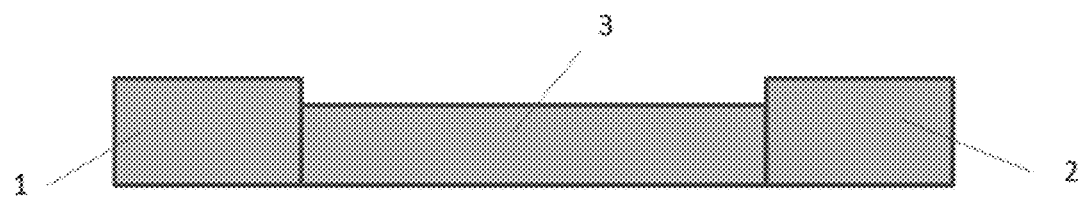
FIG. 6B is a schematic diagram of a third embodiment of the polarization attenuator of the present disclosure.
Figure 6C:
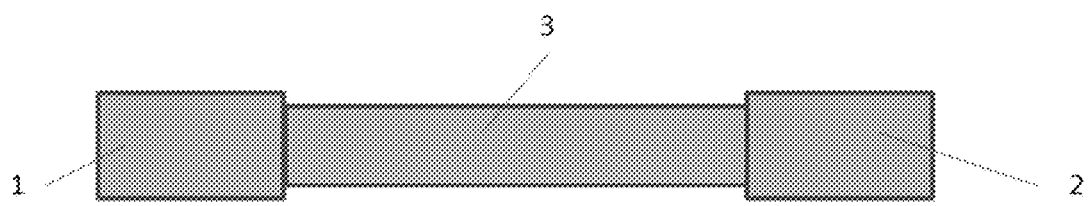
FIG. 6C is a schematic diagram of a fourth embodiment of the polarization attenuator of the present disclosure.

FIGS. 6A to 6C show various other possible offset structures and connection structures which are not limited to the illustrated structures. FIG. 6A is a schematic diagram of a second embodiment of the present disclosure and shows that the offset waveguide is in upward offset from the main waveguide input section (a first main waveguide 1), and then the main waveguide output section (a second main waveguide 2) is in offset in the same direction. FIG. 6A and FIG. 1 are complementary, and—geometrical shapes, lengths and offset parameters of the waveguides are the same. FIG. 1 shows attenuation of one polarization state, and FIG. 6A shows attenuation of the other polarization state. FIG. 6B is a schematic diagram of a third embodiment of the present disclosure, wherein one edge of the waveguide is in offset while the other edge is kept continuous. FIG. 6C is a schematic diagram of a fourth embodiment of the present disclosure and shows that the offset waveguide section is "compressed", and the width of the offset waveguide section is shorter than the width of the main waveguide section or the height of the offset waveguide section is shorter than the height of the main waveguide section (the widths of the main waveguides on two sides can also be increased). These configurations and combinations of the configurations lead to similar physical phenomena. The physical phenomena are that two adjacent waveguides at the connection structure are discontinuous, form coupling of power of incident fundamental modes and are redistributed to the fundamental mode and the high order mode of the second waveguide section, and important details only rely in calculating which high order modes will be effectively excited and which extent can be excited. Since the figures are shown in a two-dimensional plane, and can be shown in two forms of a top view and a side view. A basic requirement for the operation of the geometrical shapes and polarization attenuators of the above waveguides is that the second section at the connection structure (but not necessarily a main input waveguide and a main output waveguide) should support fundamental modes and at least one high order mode.

FIGS. 1, 6A, 6B and 6C show the geometrical structures of the waveguides in various shapes. The present disclosure provides typical simple embodiments according to the geometrical shapes, the details of specific geometrical shapes can be ignored, and the working principle is heuristically discussed based on the connection structure forming power coupling between the fundamental modes and one or more high order modes.

Figure 7:
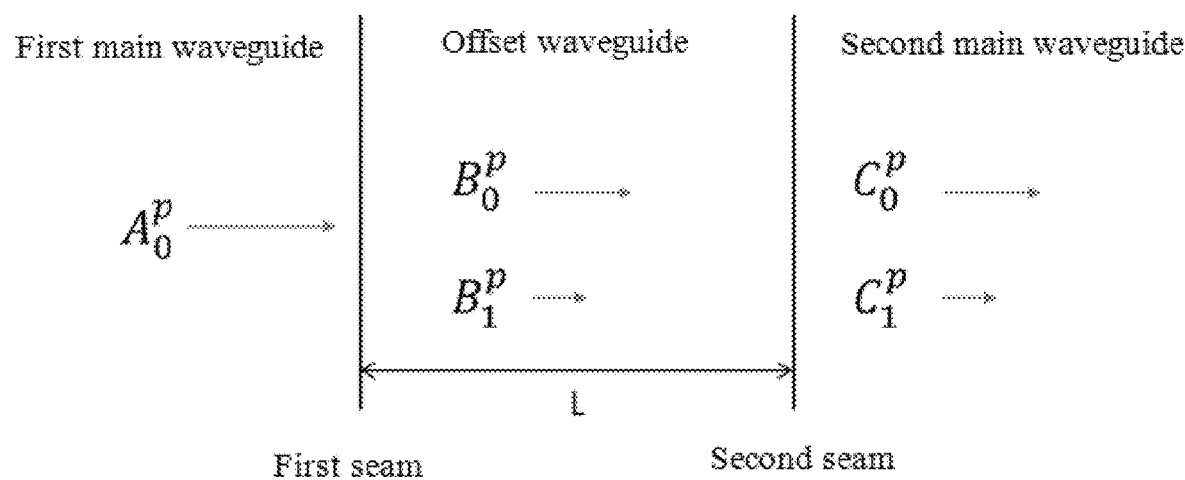
FIG. 7 is a schematic diagram of mode interaction of the polarization attenuator of the present disclosure at seams.

FIG. 7 shows a schematic diagram of fundamental mode interaction through two sequential connection structures separated by an offset waveguide with a length L. In the figure, the waveguide is divided into three sections, and it is assumed that a light field propagates from left to right. A first section is called a main waveguide input section, and a third part is called a main waveguide output section. Between the main waveguide input section and the main waveguide output section, there is a second section with a length L, and the second section is called an "offset" waveguide. Herein, "offset" means that a waveguide has discontinuous boundary from the first section to the second section, and also—from the second section to the third section. Due to the discontinuous connection structures, coupling or redistribution of mode power is caused. The light field with amplitude $A_0^P$ enters the first section and propagates toward the second section, the superscript "p" indicates one of two polarization states "1" or "2", the subscript "0" indicates a fundamental mode, $A_0^P$ propagates through the first connection structure, and is coupled to two light waves which are labeled as $B_0^P$ and $B_1^P$. "P" also indicates the polarization state, the subscript "0" indicates the fundamental mode, and "1" indicates a high order mode (common) or a set of high order modes (uncommon). Modes $B_0^P$ and $B_1^P$ propagate along the second section of waveguide at respective phase velocities, and pass through the second connection structure. After the second section of waveguide propagates into the third section of waveguide, the optical fields $B_0^P$ and $B_1^P$ are coupled or redistributed in the third section to form modes $C_0^P$ and $C_1^P$. "P" represents a polarization state, the subscript "0" represents a fundamental mode, and the subscript "1" represents a high order mode or a set of high order modes. By selecting the specific details of the first connection structure and the second connection structure and the length of the second section of waveguide, when a polarization state passes from the first section of waveguide to the third section of waveguide, attenuation higher than that of a polarization state in the second section waveguide occurs.

In order to better obtain the length L of the second section of waveguide, namely, an offset waveguide section, some mathematical calculations may be adopted. Only the excitation of a high order mode is considered in the second section of waveguide, which is also generally the desired situation. A phase propagation constant of the fundamental mode is $\beta^P_0$, and a phase propagation constant of the high order mode is $\beta^P_1$, wherein the subscript 0 or 1 represents a first polarization state or a second polarization state respectively. These propagation constants can be calculated from the waveguide geometry through precise numerical methods (such as finite difference or finite element), or approximately estimated by analytical methods such as an effective exponential method known in the art. After propagation over the entire length L of the offset waveguide section, the cumulative phase difference between the two modes is $L*(\beta^P_0-\beta^P_1)$. L is selected so that the phase accumulation of one polarization state is an integer of $2\pi$, for example $2N\pi$, wherein N is an integer; and the phase accumulation of the second polarization state is an integer multiple of $2\pi$ plus additional accumulation $\pi$, that is, $2M\pi+\pi$, wherein M is another integer. The two integers may be the same, that is, N=M. Under the above phase relationship, one polarization is lossless, while the other polarization has maximum attenuation for a given offset value h. More generally, the attenuated polarization only needs to satisfy the equation of maximum attenuation, and other values are also possible for non-maximum attenuation. On the other hand, polarization expected to have no or very little loss should follow the formula strictly. The difference between attenuated polarization and loss polarization depends on the values of N and M and the type of discontinuity (as shown in FIG. 6A and FIG. 1).

The polarization attenuator functions by redistributing power from the fundamental modes to the high order modes, and it may be desirable to discard the power carried by the high order modes in the main waveguides. One method is to reduce the widths of the waveguides non-abruptly until the high order modes are cut off, the high order modes are converted into radiation modes when cutting off, and the power dissipates from the waveguides.

Figure 8:
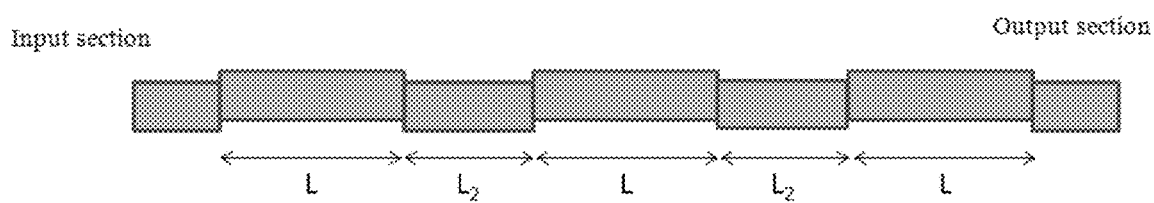
FIG. 8 is a schematic diagram of multiple polarization attenuators connected in series for increasing attenuation in a certain polarization state and simultaneously reducing loss in the other polarization state.

When the polarization attenuator is expected to work as a polarizer, it is necessary to form large attenuation for one polarization. As shown in FIG. 5, by increasing the offset value h, larger and larger attenuation can be achieved. However, when h is large enough eventually, the connection structures cause two polarizations to excite the radiation modes. The radiation modes take away two polarized power from the waveguides. The loss cannot be recovered. Although one polarization may be highly attenuated, the second polarization has undesirable losses in this case. A practical method to achieve high attenuation of one polarization and low loss of the other polarization at the same time is to connect multiple identical polarization attenuators in series, and each polarization attenuator has own small offset h and lower loss, as shown in FIG. 8. The high order modes should be discarded between the sections, because the high order modes may cause undesired losses to unattenuated polarization at subsequent connection structures or may cause polarization originally requiring large loss to be coupled back to the fundamental modes. Alternatively, if the high order modes are not discarded, a distance $L_2$ between the two sections should be selected so that no loss is caused to an expected lossless polarization state at the subsequent connection structures. Calculation of $L_2$ is similar to the previous discussion about L.

The polarization attenuator can also be tuned to change the differential attenuation extent, or switch between two polarization states to receive attenuation. Indexes of the second section are adjusted. For example, the refractive index can be adjusted in a thereto-optical mode, or if a material has an electro-optical effect, the refractive index can be adjusted in an electro-optical mode.

The invention claimed is:

1. A polarization attenuator, comprising a first main waveguide, an offset waveguide having a length L, and a second main waveguide, which are arranged in sequence, wherein:
   an output surface of the first main waveguide partially overlaps an input surface of the offset waveguide;
   an output surface of the offset waveguide partially overlaps an input surface of the second main waveguide;
   the first main waveguide or the second main waveguide supports at least one fundamental mode, and supports at least one high order mode; and
   the length L is selected so that a phase accumulation of a first polarization state in the offset waveguide is $2N\pi$, N being a first integer, and so that a phase accumulation of a second polarization state of the offset waveguide is $2M\pi+\pi$, M being a second integer.

2. The polarization attenuator according to claim 1, wherein the first main waveguide and the second main waveguide are same in cross-sectional shape and size.

3. The polarization attenuator according to claim 2, wherein the offset waveguide and the first main waveguide are same in cross-sectional shape and size, the first main waveguide and the second main waveguide are coaxially arranged, and a center line of the offset waveguide is set in an upward offset manner relative to center lines of the first main waveguide and the second main waveguide.

4. The polarization attenuator according to claim 2, wherein the offset waveguide and the first main waveguide are same in cross-sectional shape and size, the center line of the offset waveguide is set in an upward offset manner relative to the center line of the first main waveguide, and the center line of the second main waveguide is set in an upward offset manner relative to the center line of the offset waveguide.

5. The polarization attenuator according to claim 2, wherein the cross-sectional size of the offset waveguide is smaller than the cross-sectional size of the first main waveguide, and the offset waveguide the first main waveguide and the second main waveguide are arranged coaxially.

6. The polarization attenuator according to claim 2, wherein the cross-sectional size of the offset waveguide is smaller than the cross-sectional size of the first main waveguide, the first main waveguide and the second main waveguide are coaxially arranged, and the center line of the offset waveguide is set in a downward or upward offset manner relative to the center lines of the first main waveguide and the second main waveguide.

7. The polarization attenuator according to claim 2, wherein the cross-sectional size of the offset waveguide is smaller than the cross-sectional size of the first main waveguide, the first main waveguide and the second main waveguide are coaxially arranged, and the center line of the offset waveguide is set in a leftward or rightward offset manner relative to the center lines of the first main waveguide and the second main waveguide.

8. The polarization attenuator according to claim 1, wherein:

the cross-sectional size of the first main waveguide is larger than the cross-sectional size of the offset waveguide, and the cross-sectional size of the offset waveguide is larger than the cross-sectional size of the second main waveguide; or the cross-sectional size of the first main waveguide is smaller than the cross-sectional size of the offset waveguide, and the cross-sectional size of the offset waveguide is smaller than the cross-sectional size of the second main waveguide.

9. A polarization attenuation method, comprising:

selecting a length L of an offset waveguide introducing optical signals into a first main waveguide;

exciting a high order mode at a joint of the first main waveguide and the offset waveguide by the optical signals; and mixing the signals at a joint of a second main waveguide and the offset waveguide, and redistributing power between a fundamental mode and high order modes of the offset waveguide to be between a fundamental mode and a high order mode of the second main waveguide, wherein the length L is selected so that a phase accumulation of a first polarization state in the offset waveguide is $2N\pi$, N being a first integer, and so that a phase accumulation of a second polarization state of the offset waveguide is $2M\pi+\pi$, M being a second integer.

10. The polarization attenuation method according to claim 9, wherein the first integer N equals the second integer M.

11. The polarization attenuator according to claim 1, wherein the first integer N equals the second integer M.

12. The polarization attenuator according to claim 1, wherein:

the offset waveguide is offset by an offset value h from the first main waveguide; and the first polarization state is lossless while the second polarization state has a maximum attenuation for the offset value h.

13. The polarization attenuator according to claim 1, wherein:

the offset waveguide is offset by an offset value h from the first main waveguide; and the second polarization state is lossless while the first polarization state has a maximum attenuation for the offset value h.

14. A polarization attenuator, comprising a first main waveguide, an offset waveguide having a length L, and a second main waveguide, which are arranged in sequence, wherein:

an output surface of the first main waveguide partially overlaps an input surface of the offset waveguide;

an output surface of the offset waveguide partially overlaps an input surface of the second main waveguide;

the length L is selected so that a phase accumulation of a first polarization state in the offset waveguide is $2N\pi$, N being a first integer, and so that a phase accumulation of a second polarization state of the offset waveguide is $2M\pi+\pi$M being a second integer;

a light field with amplitude $A_0^P$ enters an input surface of the first main waveguide and propagates toward the offset waveguide where the superscript p indicates one of two polarization states 1 or 2 and the subscript 0 indicates a fundamental mode;

the light field with amplitude $A_0^P$ is coupled to a first light wave having a fundamental mode $B_0^P$ and a second light wave having a higher order mode or a set of high order modes $B_1^P$ propagating through the offset waveguide where the superscript p indicates one of two polarization states 1 or 2, the subscript 0 indicates the fundamental mode, and the subscript 1 indicates a high order mode or a set of high order modes; and the first light wave having $B_0^P$ and the second light wave having $B_1^P$ are redistributed in the second main waveguide to form a third light wave having $C_0^P$ and a fourth light wave having mode $C_1^P$ where the superscript p indicates one of two polarization states 1 or 2, the subscript 0 indicates the fundamental mode, and the subscript 1 indicates the high order mode or the set of high order modes.

15. The polarization attenuator according to claim 14, wherein:

a phase propagation constant of the fundamental mode is $\beta_0^P$, and a phase propagation constant of the high order mode is $\beta^P_1$, wherein the subscript 0 or 1 represents a first polarization state or a second polarization state respectively; and after propagation over the entire length L of the offset waveguide, the cumulative phase difference between the fundamental mode and the high order mode is $L*(\beta^P_0-\beta^P_1)$.

16. The polarization attenuator according to claim 14, wherein the first integer N equals the second integer M.

* * * * *